(12) United States Patent
West et al.

(10) Patent No.: US 6,766,709 B1
(45) Date of Patent: Jul. 27, 2004

(54) UNIVERSAL GEAR SELF-LOCKING/UNLOCKING MECHANISM

(76) Inventors: Thomas C. West, 47 Eleanor Ave., Standish, ME (US) 04084; Patrick S. West, 33 Sleeper St. #605, Boston, MA (US) 02210

( * ) Notice: Subject to any disclaimer, the term of this patent is extended or adjusted under 35 U.S.C. 154(b) by 0 days.

(21) Appl. No.: 10/340,155

(22) Filed: Jan. 10, 2003

(51) Int. Cl.[7] .................................................. F16H 1/16
(52) U.S. Cl. ..................... 74/425; 192/48.92; 251/249.5
(58) Field of Search ......................... 74/425; 192/48.92, 192/43.2; 251/89, 93, 129.2, 249.5

(56) References Cited

U.S. PATENT DOCUMENTS

| | | |
|---|---|---|
| 2,954,849 A | 10/1960 | Bigos |
| 4,361,308 A | 11/1982 | Buss |
| 4,823,633 A | 4/1989 | Pike |
| 4,994,001 A | 2/1991 | Wilkonson et al. |
| 5,157,983 A | 10/1992 | Sankovic |
| 5,477,752 A | 12/1995 | West et al. |
| 5,931,399 A | 8/1999 | Merrill et al. |
| 6,463,829 B2 * | 10/2002 | Torii et al. ................ 74/606 R |
| 2003/0000325 A1 * | 1/2003 | Hoehn et al. ................ 74/425 |
| 2003/0196505 A1 * | 10/2003 | Hoehn et al. ................ 74/425 |

* cited by examiner

*Primary Examiner*—David Fenstermacher
(74) *Attorney, Agent, or Firm*—Sampson & Associates, P.C.

(57) ABSTRACT

A self-locking device for a gear set is configured to permit forward-driving an input in either of first and second rotational directions and for substantially preventing an output from being back-driven in either of the rotational directions. The device includes a gear disposed to rotate with a drive shaft. The device further includes first and second releasable couplings coupled to the gear and, respectively, to first and second ratchets. The first ratchet is disposed to prevent rotation in a first direction and to permit rotation in a second direction. The second ratchet is disposed to prevent rotation in the second direction and permit rotation in the first direction. The device may be useful, for example, in a valve gearbox. A gearbox and a method of fabricating a gearbox are also disclosed.

42 Claims, 4 Drawing Sheets

UNIVERSAL GEAR SELF-LOCKING/UNLOCKING MECHANISM

BACKGROUND OF THE INVENTION (1) Field of the Invention

The present invention relates generally to a self-locking mechanism for a gear set, and more particularly to an automatic locking device that substantially prevents a gear set from being back-driven while permitting the gear set to be forward-driven.

(2) Background Information

The use of gear sets (two or more gears meshed together) is well known for a wide variety of applications and in a wide range of devices. Typically, when two or more gears of any type (e.g., helical, worm) are meshed with one another, each gear in the chain is capable of driving the others in either rotational direction (i.e., clockwise or counterclockwise). Depending upon the frictional forces inherent in the gear set, system forces acting on the resting gears may at times cause unwanted movement thereof (in either a clockwise or counterclockwise direction). For example, when positioning a butterfly valve in a fluid stream, the fluid's dynamic forces may become greater than the friction in the gear set and/or the power supply, thus moving the butterfly valve out of position and causing it to back-drive the gear set. For many applications, such back driving is undesirable.

Therefore, there exists a need for a self-locking apparatus for a gear set. In particular there exists a need for a locking apparatus that automatically locks a gear set, preventing the gear set from being back-driven, yet permitting it to be efficiently forward-driven, e.g., by a power source.

SUMMARY OF THE INVENTION

One aspect of the present invention includes a self-locking device for a gear set configured for being forward-driven at an input in either of first and second rotational directions and for substantially preventing an output from being back-driven in either of the rotational directions. The device includes an input including a drive shaft configured for being forward-driven in either of the first and second rotational directions and an output including a gear disposed to rotate with the drive shaft. The device further includes first and second releasable couplings coupled to the gear and first and second ratchets respectively coupled to the first and second releasable couplings. The first ratchet is disposed to substantially prevent rotation in the first direction and to permit rotation in the second direction, and the second ratchet is disposed to substantially prevent rotation in the second direction and permit rotation in the first direction. The first releasable coupling is disposed to selectively couple and decouple the gear with the first ratchet, and the second releasable coupling is disposed to selectively couple and decouple the gear with the second ratchet. The releasable couplings are configured to automatically, selectively engage and disengage the ratchets with the gear, the selective engaging and disengaging permitting the input to be said forward-driven in either of the rotational directions and substantially preventing the output from being said back-driven in either of the rotational directions. In one variation of this aspect, a worm gear is disposed between first and second ratchet cams. First and second friction couplings, e.g., friction plates, are interposed respectively between the first ratchet cam and the worm gear and the second ratchet cam and the worm gear.

In another aspect, this invention includes a gearbox. The gearbox includes a gear set including a gear meshed with a wheel, the gear being disposed to rotate with a drive shaft. First and second releasable couplings are coupled to the gear. First and second ratchets are respectively coupled to the first and second releasable couplings. The first ratchet is disposed to substantially prevent rotation in a first direction and to permit rotation in a second direction, and the second ratchet is disposed to substantially prevent rotation in the second direction and to permit rotation in the first direction. The first releasable coupling is disposed to selectively couple and decouple the gear with the first ratchet, and the second releasable coupling is disposed to selectively couple and decouple the gear with the second ratchet. The releasable couplings are configured to automatically, selectively engage and disengage the ratchets with the gear, the selective engaging and disengaging permitting the input to be forward-driven in either of the rotational directions and substantially preventing the output from being back-driven in either of the rotational directions. A method for fabricating a gearbox is also provided.

DETAILED DESCRIPTION

The present invention addresses the above-described need for a self-locking device for a gear set. Referring briefly to the accompanying figures, embodiments of this invention include an apparatus that substantially prevents a gear set from being back-driven, while permitting the gear set to be efficiently forward-driven. Exemplary embodiments of the self-locking device include first and second ratchet cams disposed about a gear member, e.g., a worm gear. First and second releasable coupling members are interposed between the gear member and each respective ratchet cam to facilitate selective coupling and decoupling thereof. The ratchet cams are disposed to rotate substantially freely in opposite directions, i.e., one of the ratchet cams rotates substantially freely in the clockwise direction while the other rotates substantially freely in the counterclockwise direction. Certain embodiments of the locking device of this invention may be useful in a gearbox for use in, for example, valve applications.

Exemplary embodiments of this invention advantageously provide a self-locking device that substantially prevents system forces from back-driving a gear set in either rotational direction, while simultaneously permitting the gear set to be forward-driven. Apparatuses utilizing exemplary embodiments of this invention may thus be advantageous in that they may include gear sets having a relatively high efficiency (e.g., the ratio of output force to input force being greater than about 50%), which tends to reduce both capital and operational expenses (e.g., power consumption). These and other advantages of this invention will become evident in light of the following discussion of various embodiments thereof.

Figure 1A:
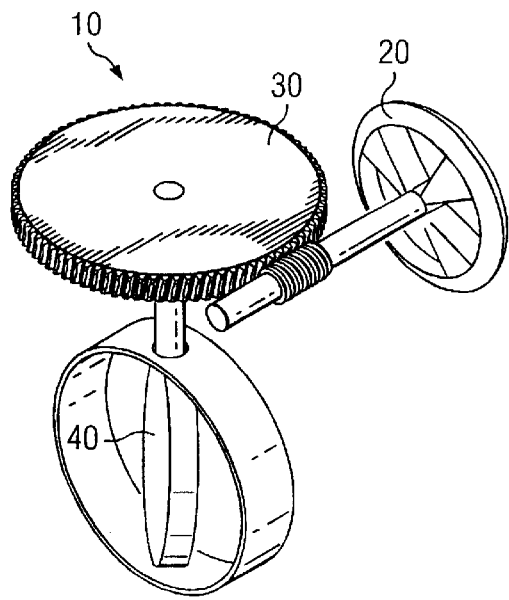
FIG. 1A is a schematic illustration of a prior art apparatus for positioning a butterfly valve.
Figure 1B:
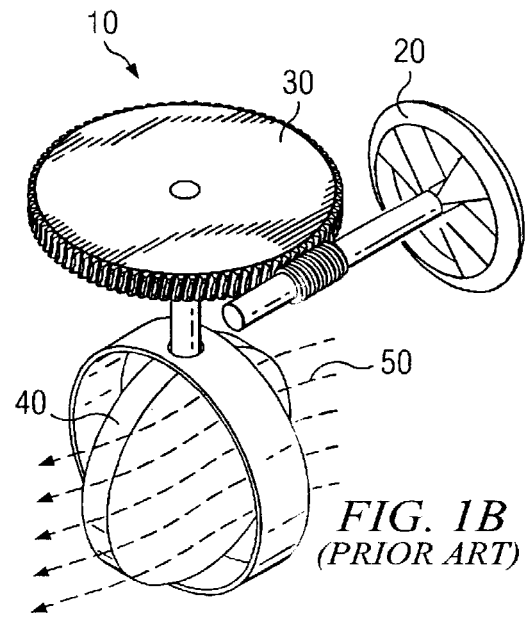
FIG. 1B is a schematic illustration of the apparatus of FIG. 1A showing a fluid stream back-driving the apparatus.

Referring now to FIGS. 1A through 7, prior art and the apparatus and method of the present invention are described in more detail. As described briefly hereinabove, and as shown in FIGS. 1A and 1B, a prior art apparatus 10 includes a power source 20 (e.g., a manual hand-wheel or an electric motor) coupled to a gear set 30, which is further coupled to, for example, a butterfly valve 40. As shown in FIG. 1A, the butterfly valve 40 may be positioned by actuation of the power source 20 (e.g., rotation of a hand-wheel). However, as shown in FIG. 1B, the prior art apparatus 10 also permits system forces, such as fluid pressure from a fluid stream 50, acting on the butterfly valve 40 to back-drive the gear set 30 and power source 20. For example, after the butterfly valve 40 has been positioned in a fluid stream 50 and power removed from the power source 20, fluid pressure acting to further open the butterfly valve 40 may be greater than the system friction (e.g., friction in gear set 30 and/or power source 20) causing the butterfly valve to back-drive the gear set 30. Similarly, during positioning of the butterfly valve 40, the fluid pressure, if great enough, may back-drive the power source 20 and open the butterfly valve 40 more rapidly or to a greater extent than desired. Such back-driving of the gear set 30 and power source 20 tends to be undesirable for many applications.

Apparatuses and mechanisms are known in the art for locking gears of various types. For example, Pike, in U.S. Pat. No. 4,823,633, disclose a gear lock having locking faces that fit around one or more teeth in a gear, thereby locking it in position. The gear lock is disposed such that the locking faces may selectively engage and disengage the teeth, locking and unlocking the gear lock. Sankovic, in U.S. Pat. No. 5,157,983, discloses a similar locking device in which protruding fingers disposed about a slot in a shaft fit around one or more teeth in a gear.

While the apparatuses disclosed by Pike and Sankovic, respectively, apparently may be useful for locking gear sets for some applications, their potential range of application tends to be limited in that the mechanism for locking involves fitting members around one or more of the teeth in a gear, which only enables the gears to be locked in certain pre-determined positions. Furthermore, the disclosed locking apparatuses are not self-locking and thus require distinct actuation and deactuation, separate from that powering the gear set, in order to lock and unlock. Conventional locking apparatuses also tend to be static, in that they lock the gear set in a rest position and thus tend not to inhibit system force from back-driving a gear set while it is being forward-driven.

An alternate approach to providing positional stabilization, i.e., preventing a gear set from being back-driven, is for example, to fabricate a worm gear set having a low helical angle (less than about 6 degrees) which may be considered self-locking for some applications in that the frictional forces in the gear set cause the system to be self locking. These systems inherently have low efficiency (less than about 33 percent). In such a system the normal force acting on the gear times the coefficient of friction results in tangential force that is typically greater than the back-driving force, which essentially locks the gear set. Inefficient gear sets, however, tend to be disadvantageous in that a larger power source is required to forward-drive the gear set, which tends to increase both capital and operational expenses.

Figure 2:
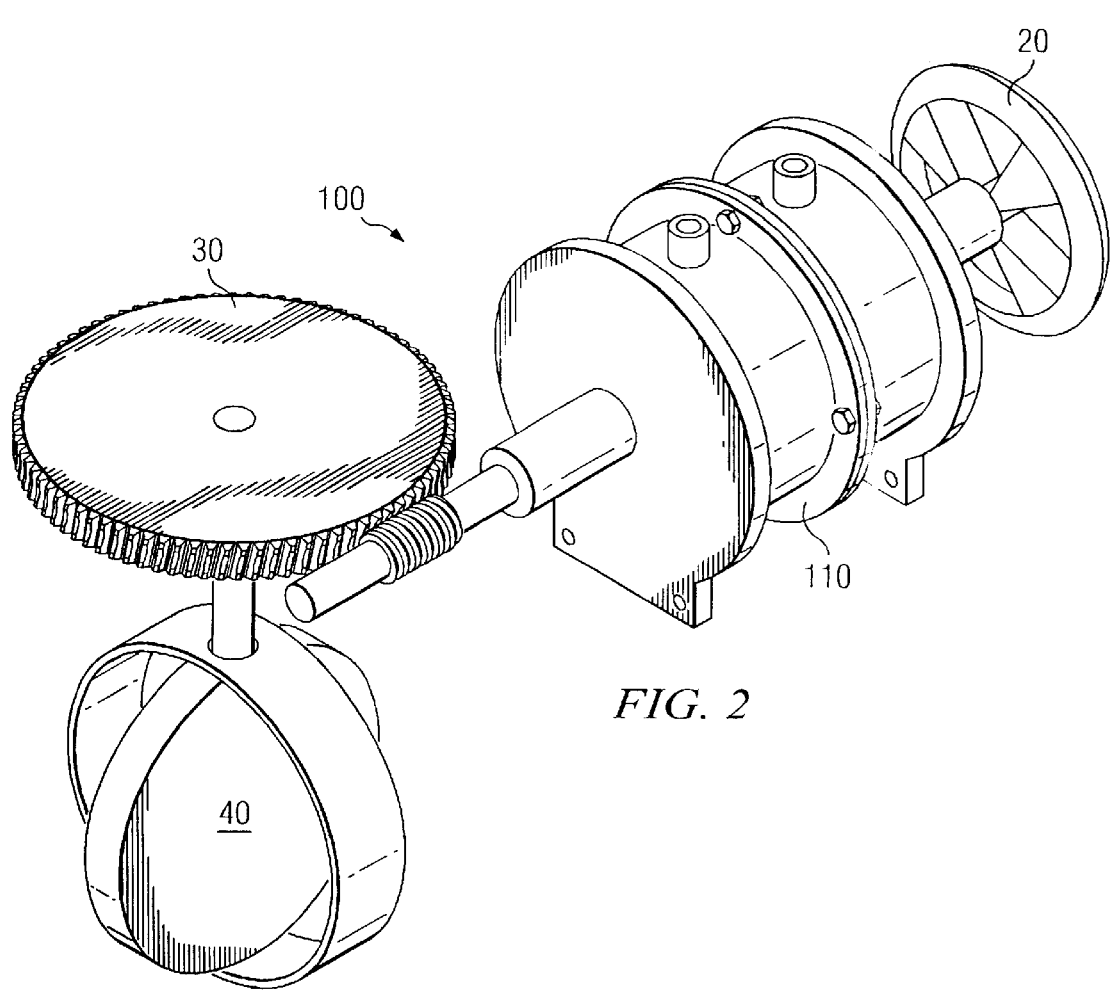
FIG. 2 is a schematic illustration, perspective view, of an apparatus utilizing an automatic locking device according to one exemplary embodiment of the present invention.

Referring now to FIGS. 2–7, exemplary embodiments of the present invention are illustrated. FIG. 2 schematically illustrates one exemplary embodiment of an automatic locking device 110 according to the present invention in use in an apparatus generally denoted as 100. Apparatus 100 is similar to prior art apparatus 10 described hereinabove with respect to FIG. 1 in that it includes a power source 20 coupled to a gear set 30, which is in turn coupled to a butterfly valve 40. Apparatus 100 is distinct from apparatus 10 in that a universal self-locking device 110 is interposed between the power source 20 and the gear set 30. The universal self-locking device 110 substantially prevents the butterfly valve 40 from back-driving the gear set, while permitting it to be forward-driven by the power source 20.

It will be understood by those of ordinary skill in the art that embodiments of the automatic locking device of the present invention are not limited to use with a butterfly valve assembly as shown in FIG. 2. Embodiments of the locking device may be equally well suited in substantially any application in which it is desirable to automatically lock and unlock a gear set or to prevent a gear set from being back-driven, such as, for example, damper control applications, jack screw applications in which a ball screw is used, worm geared winches, gear set speed control devices, roll drives, and the like. It will also be understood that embodiments of this invention may be utilized in apparatuses including gear sets having substantially any number of gears. The invention is not limited in these regards.

Figure 3:
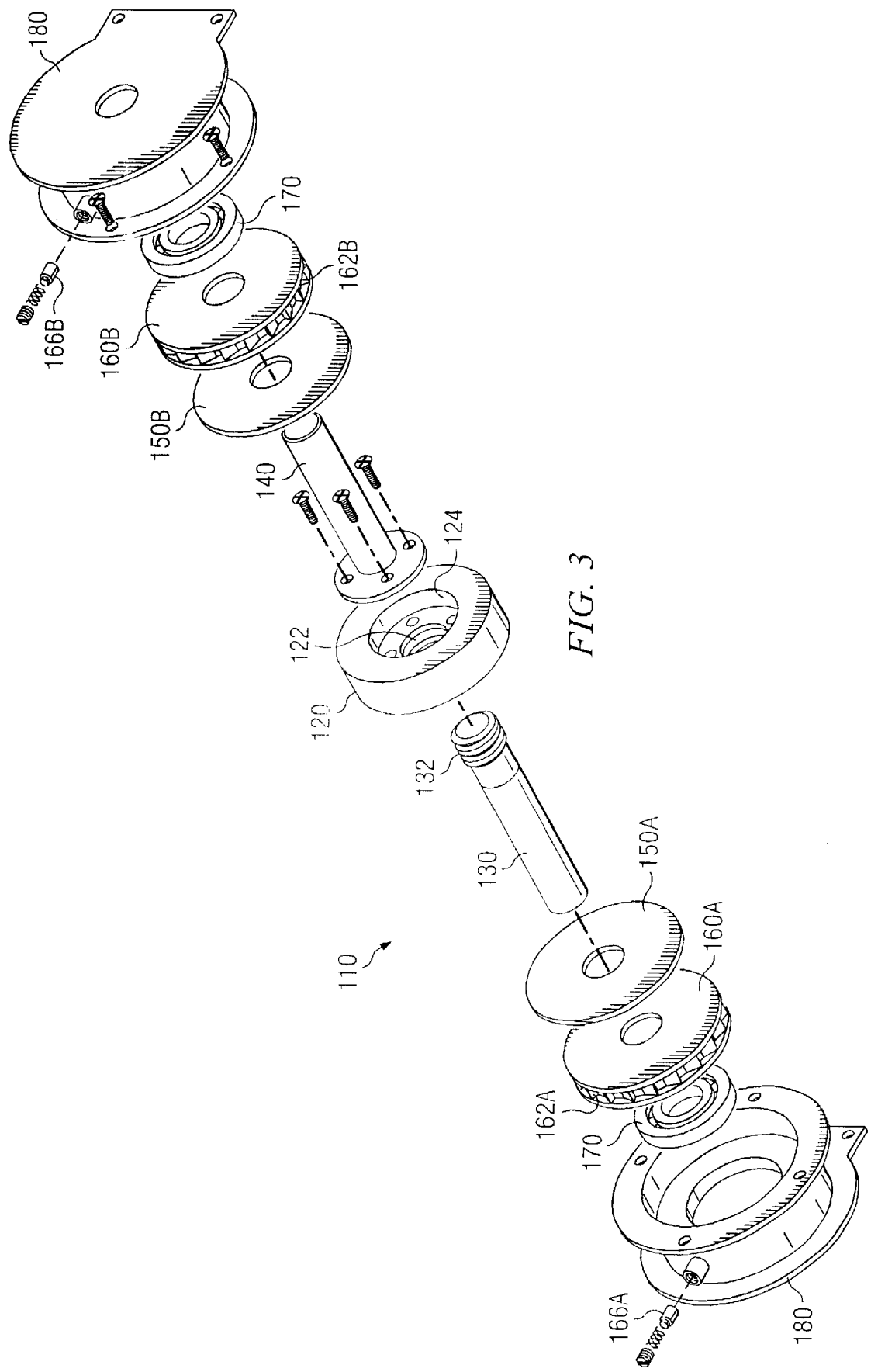
FIG. 3 is a schematic illustration, exploded view of the embodiment of FIG. 2.
Figure 4:
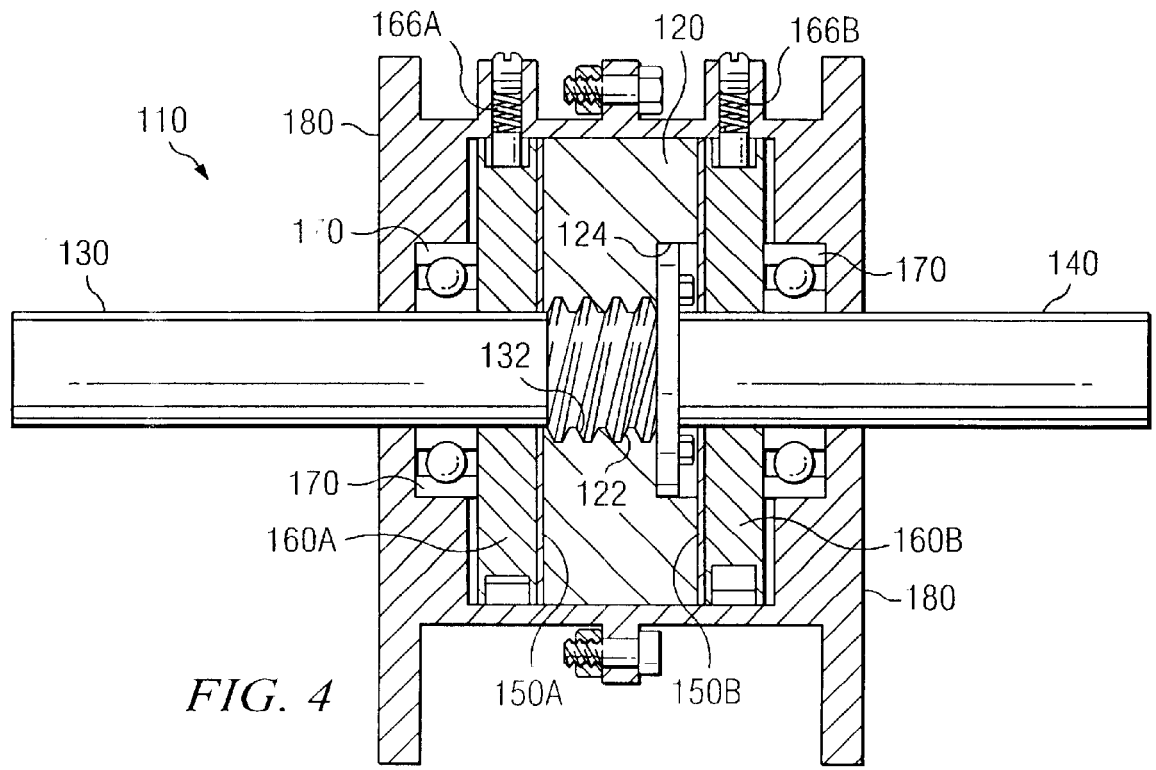
FIG. 4 is a schematic illustration, cross-sectional view of the embodiment of FIG. 2.

Referring now to FIGS. 3 and 4, which illustrate exploded and cross-sectional views, respectively, the structure and function of one exemplary embodiment of automatic locking device 110 is described in more detail. It will be understood that like-numbered items denote elements serving equivalent function and structure. Thus a general reference to coupling member 150, for example, applies to each of the coupling members 150A and 150B. It will be further understood that all reference to rotational direction, i.e., clockwise and counterclockwise, unless otherwise specifically stated, is from the vantage point of looking down the drive shaft 140 from the power supply 20 towards the locking device 110. Locking device 110 includes an internal helical gear member 120, first and second coupling members 150A and 150B (also referred to herein as releasable couplings), and first and second ratchet cams 160A and 160B typically disposed in a housing 180. Internal helical gear 120 is interposed between the first and second ratchet cams 160A and 160B. Ratchet cam 160A is disposed distal to power supply 20 with the teeth 162A thereof engaging spring-loaded pawl 166A. Ratchet cam 160B is disposed proximal to the power supply 20 with the teeth 162B thereof engaging spring-loaded pawl 166B.

The combination of ratchet cam and corresponding pawl (s) may be collectively referred to herein as a ratchet. Moreover, as used herein, the term 'ratchet' includes nominally any uni-directional device capable of permitting rotation in one direction, while substantially preventing rotation in the opposite direction. Examples of ratchets suitable for use in the present invention include the ratchet cam/pawl combinations disclosed herein, strap wrenches, and various other devices and systems presently known to those skilled in the art and/or which may be devised hereafter. As described in more detail hereinbelow, the embodiments shown and described herein include ratchets having ratchet cams 160 disposed to rotate substantially freely in opposite directions, i.e., one in the clockwise direction and the other in the counterclockwise direction.

Locking device 110 further includes a first coupling member 150A interposed between the internal helical gear 120 and the first ratchet cam 160A and a second coupling member 150B interposed between the internal helical gear 120 and the second ratchet cam 160B. As described in more detail hereinbelow, the coupling members 150 are disposed to selectively couple and decouple the internal helical gear 120 with the respective ratchet cam 160.

With continued reference to FIGS. 3 and 4, an output shaft 130, which is fitted with a helical thread 132, is threadably coupled with the internal helical gear member 120. Output shaft 130 is disposed distal to the power supply 20 and is typically meshed to the gear set, for example, by a worm or helical gear. In embodiments in which a right-hand helical thread 132 is utilized (as shown on FIG. 3), ratchet cam 160A is disposed to rotate substantially freely in the clockwise direction with the teeth 162A thereof sliding past pawl 166A. Counterclockwise rotation of ratchet cam 160A is substantially prevented owing the engagement of pawl 166A with teeth 162A. Conversely, ratchet cam 160B is disposed to rotate substantially freely in the counterclockwise direction with clockwise rotation being substantially prevented owing to the engagement of pawl 166B with teeth 162B. It will be understood that in embodiments in which an output shaft having a left-hand helical thread (not shown) is utilized that ratchet cam 160A will be disposed to rotate substantially freely in the counterclockwise direction while ratchet cam 160B will be disposed to rotate substantially freely in the clockwise direction.

A drive shaft 140 is fastened (e.g., screwed, bolted, or welded) to the internal helical gear 120 (e.g., in recess 122) on the side opposing the output shaft 130 (i.e., proximal to power supply 20) and is typically coaxial therewith. The coupling members 150 and the ratchet cams 160 ride axially on the respective shafts 130 and 140. The spring-loaded paws 166, which as described above are disposed to follow the teeth 162 of the ratchet cams 160, are typically mounted to the housing, for example, by conventional fastening arrangements, such as a bolt, pin, or screw. It will be understood that the locking device 110 may further include bushings and/or bearings 170 riding axially on the shafts 130 and 140 and disposed between the ratchet cams 160 and housing 180 to minimize friction therebetween.

Referring again to FIG. 2, and with continued reference to FIGS. 3 and 4, locking device 110 functions, as described hereinabove, to prevent the gear set from being back-driven by, for example, butterfly valve 40. As a starting reference point for describing its function, assume that the locking device 110 is at rest, with no torque applied to either of the shafts 130 and 140. The application of a torque to the drive shaft 140 (e.g., by power source 20) in a clockwise direction, tightens internal helical gear member 120 on helical thread 132, resulting in an axial force that urges helical gear member 120 towards coupling member 150A and away from coupling member 150B. The axial force thereby promotes coupling of the internal helical gear 120 with the first ratchet cam 160A and decoupling of the internal helical gear 120 from the second ratchet cam 160B. Thus, the drive shaft 140 may be forward-driven substantially freely in the clockwise direction with the internal helical gear 120 rotating with the first ratchet cam 160A (being substantially coupled thereto) and rotating substantially freely past, i.e., independently of, the second ratchet cam (being substantially decoupled therefrom).

The application of a torque to the drive shaft 140 in a counterclockwise direction, loosens (i.e. begins to unthread) internal helical gear member 120 on helical thread 132, resulting in an axial force that urges helical gear member 120 towards coupling member 150B and away from coupling member 150A. The axial force thereby promotes coupling of the internal helical gear 120 with the second ratchet cam 160B and decoupling of the internal helical gear 120 from the first ratchet cam 160A. Thus, the drive shaft 140 may also be forward-driven substantially freely in the counterclockwise direction with the internal helical gear 120 rotating with the second ratchet cam 160B (being substantially coupled thereto) and rotating past the first ratchet cam 160A (being substantially decoupled therefrom). A torque applied to the drive shaft 140 in either direction (clockwise or counterclockwise) is thus transferred to the output shaft 130, enabling power supply 20 to forward-drive, for example, butterfly valve 40.

With continued reference to FIGS. 2 through 4, the application of a torque to the output shaft 130 (e.g., by fluid stream 50 acting on butterfly valve 40) in a clockwise direction, loosens (i.e. begins to unthread) internal helical gear 120 on helical thread 132, resulting in an axial force that urges helical gear member 120 towards the second coupling member 150B. As described above, the axial force thereby promotes coupling of the internal helical gear 120 with the second ratchet cam 160B. However, as also described above, the second ratchet cam 160B is substantially prevented from rotating in the clockwise direction owing to the engagement of pawl 166B with teeth 162B. The application of a torque to the output shaft 130 in a counterclockwise direction tightens internal helical gear member 120 on helical thread 132, resulting in an axial force that urges helical gear member 120 towards the first coupling member 150A. The axial force thereby promotes coupling of the internal helical gear 120 with the first ratchet cam 160A. However, as described above, ratchet cam 160A is inhibited from rotating in the counterclockwise direction owing to the engagement of pawl 166A with teeth 162A. Thus automatic locking device 110 substantially prevents system forces from back-driving the device (and hence a gear set such as gear set 30), with ratchet cam 160A preventing counterclockwise rotation and ratchet cam 160B preventing clockwise rotation of output shaft 130.

While the above discussion pertaining to the operation of exemplary embodiments of this invention assumes that the automatic locking device 110 is at rest, it will be understood that the operation of the locking device 110 is not limited in this regard. Rather, embodiments of this invention may operate to prevent system forces from back-driving the device 110, while substantially simultaneously permitting the device 110 to be forward-driven (e.g., by power supply 20). Embodiments of this invention may therefore be advantageous in applications in which it is desirable to control the rotation rate of a gear set, e.g., in an application in which it is desirable to slowly open a valve (e.g., butterfly valve 40 shown in FIG. 2). In such an application, prior art apparatuses typically require the power supply to provide both the torque necessary to open the valve and the torque necessary to oppose the system forces (e.g., from fluid stream 50). Hence, if upon partially opening the valve, the system forces act to rapidly further open the valve, it is typically necessary for the power supply to equally rapidly oppose those system forces (i.e., to provide a braking force). Exemplary embodiments of this invention are advantageous in that they automatically oppose the above-described system forces (i.e., provide the braking force), only permitting the valve to open by the action of the power supply. Such function may therefore advantageously reduce complexity, e.g., as resulting from feedback loops and the like, and therefore fabrication costs, of speed control devices.

Figure 5:
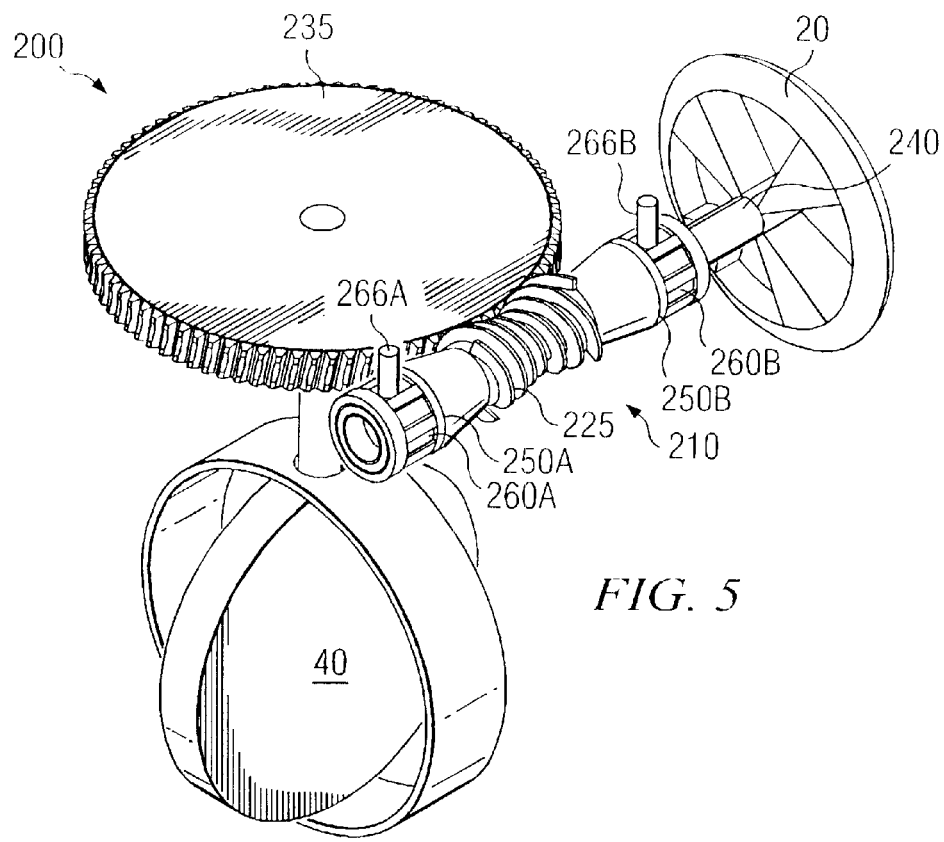
FIG. 5 is a schematic illustration, perspective view, of another exemplary embodiment of a locking mechanism according to the present invention.

Referring now to FIG. 5, a perspective view of another exemplary embodiment of an automatic locking device 210 of this invention is illustrated in use in an apparatus 200 for controlling the position of a butterfly valve 40. Automatic locking device 210 is similar to that of locking device 110 in that it includes first and second coupling members 250A and 250B disposed adjacent to first and second ratchet cams 260A and 260B, respectively. Locking device 210 includes a worm gear 225 disposed substantially coaxially on a drive shaft 240. The artisan of ordinary skill will readily recognize that the worm gear 225 may be either coupled to or integral with the drive shaft 240. The locking device 210 further includes first and second ratchet cams 160A and 160B disposed on opposing ends of the worm gear 225, the ratchet cams 160 being disposed coaxially on the drive shaft 240. Ratchet cam 260A is disposed distal to power supply 20 with the teeth 262A thereof engaging pawl 266A. Ratchet cam 260B is disposed proximal to power supply 20 with the teeth 262B thereof engaging pawl 266B. In embodiments in which a right-hand threaded worm gear 225 is utilized (as shown in FIG. 5), ratchet cam 260A rotates substantially freely in the clockwise direction, but is substantially prevented from rotating in the counterclockwise direction owing to the engagement of pawl 266A with teeth 262A. Conversely, ratchet cam 260B rotates substantially freely in the counterclockwise direction, but is substantially prevented from rotating in the clockwise direction owing to the engagement of pawl 266B with teeth 262B. It will be understood that in embodiments in which a left-hand threaded worm gear (not shown) is utilized, ratchet cam 260A is disposed to rotate substantially freely in the counterclockwise direction while ratchet cam 260B is disposed to rotate substantially freely in the clockwise direction. Locking device 210 further includes a first coupling member 250A interposed between the worm gear 225 and ratchet cam 260A and a second coupling member 250B interposed between the worm gear 225 and ratchet cam 260B. As described in more detail hereinbelow, the coupling members 250 are disposed to selectively couple and decouple the worm gear with the respective adjacent ratchet cam 260.

With further reference to FIG. 5, locking device 210 functions, as described hereinabove, to prevent worm wheel 235 from being back-driven by, for example, butterfly valve 40. Locking device 210 functions similarly to that of locking device 110, however, it is distinct in that it makes use of the natural axial forces present in gear members. The application of a torque to the drive shaft in a clockwise direction causes the worm gear 225 to impart a torque to the worm wheel 235 in a counterclockwise direction (looking towards the butterfly valve 40 from the worm wheel 235), which results in an opposing axial force in the worm gear (herein referred to as a natural axial force). This natural axial force urges the worm gear 225 axially towards coupling member 250A, thereby promoting coupling of the worm gear 225 with the first ratchet cam 260A and decoupling of the worm gear 225 from the second ratchet cam 260B. As described above in the preceding paragraph, ratchet cam 260A is disposed to rotate substantially freely in the clockwise direction. Thus the drive shaft 240 may be forward-driven substantially freely in the clockwise direction, the worm gear 225 rotating with the first ratchet cam 260A (being substantially coupled thereto) and rotating past the second ratchet cam 260B (being substantially decoupled therefrom). The artisan of ordinary skill will readily understand, based on the principles described above, that the application of a torque in the counterclockwise direction to the drive shaft promotes coupling of the worm gear 225 to the second ratchet cam 260B and decoupling of it from the first ratchet cam 260A. Thus, the drive shaft may also be forward-driven substantially freely in the counterclockwise direction, the worm gear 225 rotating with the second ratchet cam 260B and past the first ratchet cam 260A.

With continued reference to FIG. 5, the application of a torque to the worm wheel 235 (e.g., by fluid a fluid stream acting on butterfly valve 40) in a clockwise direction (looking downward towards the butterfly valve 40) results in a natural axial force urging the worm gear 225 towards coupling member 250A, thereby promoting coupling of the worm gear 225 to the first ratchet cam 260A. Rotation of the worm gear 225, and thus the drive shaft 240, in the counterclockwise direction is prevented by the engagement of pawl 266A with teeth 262A. Thus, the locking device 210 prevents the worm wheel 235 from being back-driven in the clockwise direction. The artisan of ordinary skill will also readily understand that the application of a torque in the counterclockwise direction (looking downward towards the butterfly valve 40) to the worm wheel 235 promotes the coupling of the worm gear 225 to ratchet cam 260B, thus also preventing the worm wheel 235 from being back-driven in the counterclockwise direction.

Figure 6:
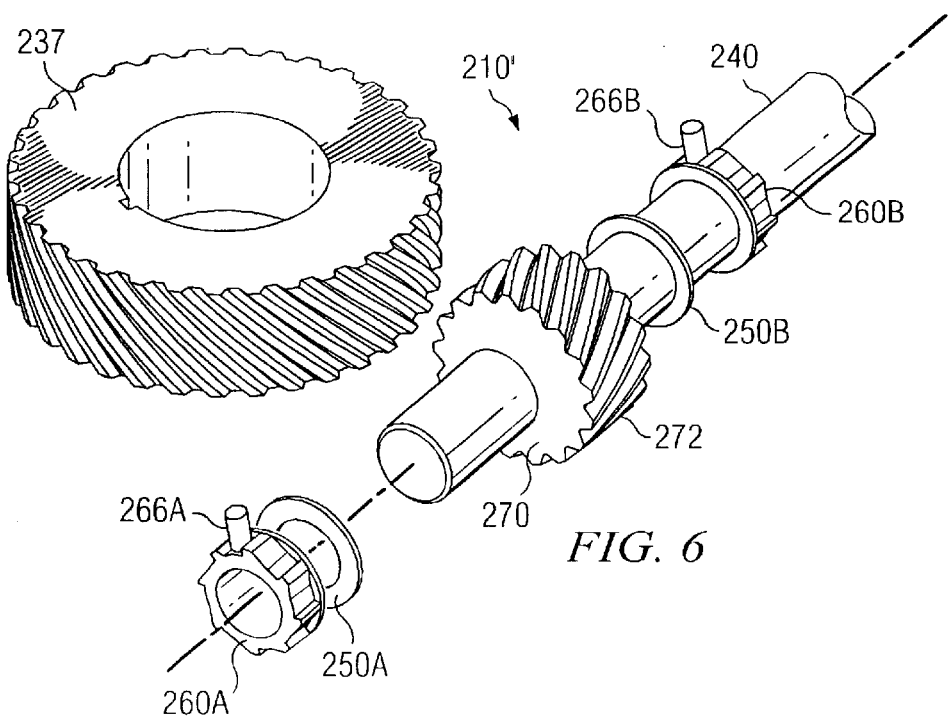
FIG. 6 is a schematic illustration, perspective view, of yet another exemplary embodiment of a locking mechanism according to the present invention.
Figure 7:
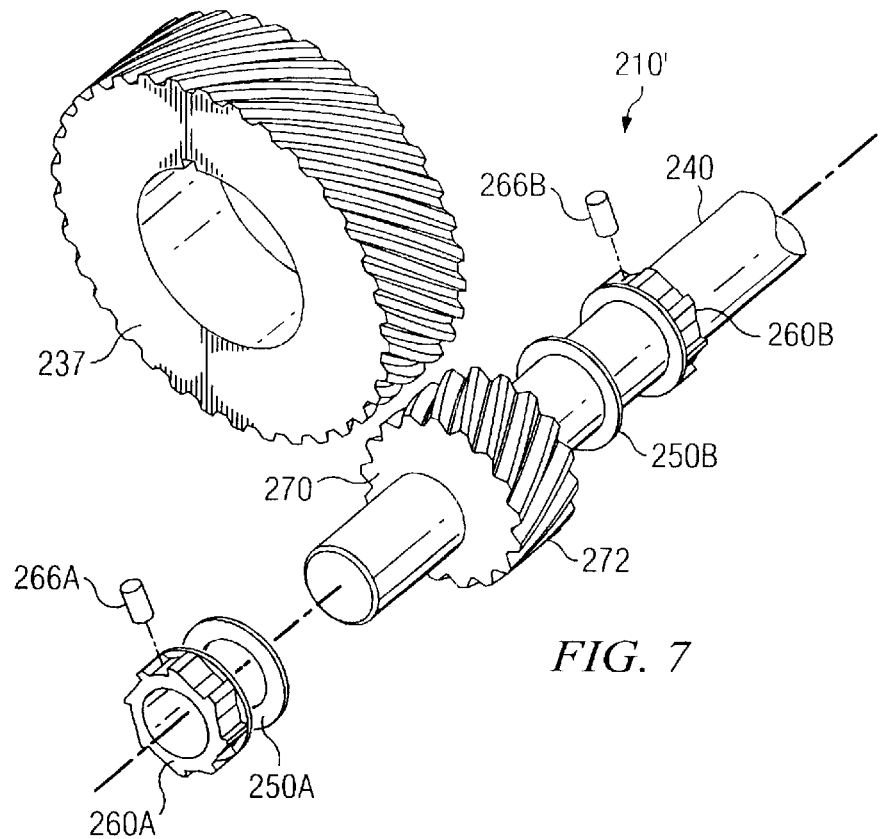
FIG. 7 is a schematic illustration, perspective view, of the embodiment of FIG. 6 engaging a wheel disposed orthogonal to that shown in FIG. 6.

The artisan of ordinary skill will readily recognize that embodiments of automatic locking device 210 are not limited to the use of a worm gear 225. For example, referring now to FIGS. 6 and 7, an exploded view of yet another exemplary embodiment of an automatic locking device 210' of this invention is illustrated. Automatic locking device 210' is substantially identical to that of locking device 210, with the exception that the worm gear 225 of locking device 210 has been replaced with a helical gear member 270. Helical gear member may be sized and shaped to mesh with a helical wheel 237 disposed in substantially any apparatus in which embodiments of the automatic locking device of this invention may be used. The teeth 272 of the helical gear member 270 may be disposed at substantially any helical angle, for example, in some exemplary applications, a helical angle greater than about 10 degrees may be desirable to promote sufficient axial forces for coupling/decoupling. The use of a helical gear member 270 may be advantageous for some applications in that it may be configured to mesh with a helical wheel 237 having an axis of rotation either substantially orthogonal to the drive shaft 240 (e.g., as shown in FIG. 6) or substantially parallel to the drive shaft 240 (e.g., as shown in FIG. 7). It will be understood that automatic locking device 210' functions substantially identically to that of locking device 210.

The artisan of ordinary skill will readily recognize that substantially any suitable coupling member may be utilized. In the exemplary embodiments described above with respect to FIGS. 3 through 7, friction plates are utilized. In those embodiments, the axial forces described above increase the pressure on one of the friction plates (e.g., coupling member 150A) and decrease the pressure on the other (e.g., coupling member 150B). The friction plates are typically fabricated having a coefficient of friction in a range such that the increased pressure on the one friction plate substantially eliminates slipping between the gear member (e.g., internal helical gear 120), the friction plate, and the ratchet cam. Conversely, the decreased pressure on the other friction plate substantially decouples the gear member from the ratchet cam, i.e., permitting the gear member to rotate substantially freely past (independently of) the friction plate. Depending upon the application, friction plates having substantially any friction value may be utilized. For example, for some exemplary applications, such as an exemplary valve application, a total friction value greater than or equal to about 0.1 may be desirable.

It will be further recognized that for some applications, for example those in which a relatively high coupling force is needed, it may be desirable to utilize other types of coupling members, such as multiple plate or conical friction couplings. In still other embodiments one or more of the coupling members may include a mechanical coupling such as a cervix coupling including radial spline that are interlockable with complementary spline disposed on the gear member and/or the ratchet cams. Moreover, electronically actuated couplings may also be utilized without departing from the spirit and scope of the invention. It should thus be understood that the invention is not limited in regards to the type of coupling member utilized.

While the various embodiments described hereinabove and shown in the accompanying figures employ ratchets including ratchet cams having teeth that engage spring loaded pawls, it will be understood that this invention is not limited by the type and/or configuration of the ratchets, which may utilize substantially any suitable uni-directional device. For example, alternate embodiments may include ratchets including spring loaded pawls disposed thereon that engage teeth and/or splines disposed, for example, on a housing.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A self-locking device for a gear set, configured for being forward-driven at an input in either of first and second rotational directions, and for substantially preventing an output from being back-driven in either of the rotational directions, the device comprising:

an input including a drive shaft configured for being forward-driven in either of the first and second rotational directions;

an output including a gear disposed to rotate with the drive shaft;

first and second releasable couplings coupled to the gear;

first and second ratchets respectively coupled to the first and second releasable couplings;

the first ratchet disposed to substantially prevent rotation in the first direction and to permit rotation in the second direction;

the second ratchet disposed to substantially prevent rotation in the second direction and permit rotation in the first direction;

the first releasable coupling disposed to selectively couple and decouple the gear with the first ratchet;

the second releasable coupling disposed to selectively couple and decouple the gear with the second ratchet; and the releasable couplings being configured to automatically, selectively engage and disengage the ratchets with the gear, said selective engaging and disengaging permitting the input to be said forward-driven in either of the rotational directions and substantially preventing the output from being said back-driven in either of the rotational directions.

2. The self-locking device of claim 1, wherein:

the application of a torque to forward-drive the input in the first direction substantially couples and decouples respectively the second and first ratchets with the gear, permitting the gear to be forward-driven substantially freely in the first direction; and the application of a torque to forward-drive the input in the second direction substantially couples and decouples respectively the first and second ratchets with the gear, permitting the gear to be forward-driven substantially freely in the second direction.

3. The self-locking device of claim 1, wherein:

the application of a torque disposed to back-drive the output in the first direction substantially couples the first ratchet with the gear, the first ratchet substantially preventing the gear from being said back-driven in the first direction; and the application of a torque disposed to back-drive the output in the second direction substantially couples the second ratchet with the gear, the second ratchet substantially preventing the gear from being said back-driven in the second direction.

4. The self-locking device of claim 1, wherein at least one of the releasable couplings comprises a friction coupling.

5. The self-locking device of claim 4, wherein the at least one releasable coupling comprises a friction plate coupling.

6. The self-locking device of claim 4, wherein the at least one releasable coupling comprises a multiple plate coupling.

7. The self-locking device of claim 4, wherein the at least one releasable coupling comprises a conical friction coupling.

8. The self-locking device of claim 1, wherein at least one of the releasable couplings comprises a mechanical coupling.

9. The self-locking device of claim 1, wherein the gear, the first and second releasable couplings, and the first and second ratchets are disposed substantially coaxially with the drive shaft.

10. The self-locking device of claim 1, wherein the first and second ratchets are disposed on opposing sides of the gear.

11. The self-locking device of claim 10, wherein the first releasable coupling is interposed between the gear and the first ratchet and the second releasable coupling is interposed between the gear and the second ratchet.

12. The self-locking device of claim 1, wherein the gear comprises an internal helical gear.

13. The self-locking device of claim 12, wherein one end of the drive shaft is mounted to the internal helical gear.

14. The self-locking device of claim 13, further comprising an output shaft disposed coaxially with the drive shaft, the output shaft having a helical thread disposed on one end thereof, the helical thread being threadably engaged with the internal helical gear.

15. The self-locking device of claim 14, wherein:

the application of a torque disposed to said forward-drive the drive shaft in the first direction substantially loosens the internal helical gear on the helical thread, to substantially couple and decouple respectively the second and first ratchets with the internal helical gear, permitting the internal helical gear to be forward-driven substantially freely in the first direction; and the application of a torque disposed to forward-drive the drive shaft in the second direction substantially tightens the internal helical gear on the helical thread, to substantially couple and decouple respectively the first and second ratchets with the internal helical gear, permitting the internal helical gear to be said forward-driven substantially freely in the second first direction.

16. The self-locking device of claim 14, wherein:

the application of a torque disposed to said back-drive the internal helical gear in the first direction substantially tightens the internal helical gear on the helical thread, to substantially couple the first ratchet with the internal helical gear, the first ratchet substantially preventing the internal helical gear from being back-driven in the first direction; and the application of a torque disposed to back-drive the internal helical gear in the second direction substantially loosens the internal helical gear on the helical thread, to substantially couple the second ratchet with the internal helical gear, the second ratchet substantially preventing the internal helical gear from being said back-driven in the second direction.

17. The self-locking device of claim 1, wherein the gear is configured for axial movement respectively away from and towards the first and second releasable couplings while being said forward-driven in the first and second directions.

18. The self-locking device of claim 1, wherein the gear is configured for axial movement respectively towards and away from the first and second releasable couplings while being said back-driven in the first and second directions.

19. The self-locking device of claim 1, wherein the gear comprises an external gear, the external gear being disposed to mesh with the gear set.

20. The self-locking device of claim 19, wherein the external gear comprises a worm gear.

21. The self-locking device of claim 19, wherein the external gear comprises a helical gear.

22. The self-locking device of claim 19, wherein said selective coupling and decoupling of the external gear with the first and second ratchets is effected by natural axial forces on the external gear, the natural axial forces being generated by engagement of the external gear with the gear set.

23. The self-locking device of claim 19, wherein:

the application of a torque disposed to forward-drive the drive shaft in the, first direction effects an axial force on the external gear, the axial force urging the external gear towards the second ratchet to substantially couple and decouple respectively the second and first ratchets with the external gear, permitting the gear to be forward-driven substantially freely in the first direction; and the application of a torque disposed to forward-drive the drive shaft in the second direction effects an axial force on the external gear, the axial force urging the external gear towards the first ratchet to substantially couple and decouple respectively the first and second ratchets with the external gear, permitting the gear to be forward-driven substantially freely in the second direction.

24. The self-locking device of claim 19, wherein:

the application of a torque disposed to back-drive the gear in the first direction effects an axial force on the external gear, the axial force urging the external gear towards the first ratchet to substantially couple the first ratchet with the external gear, the first ratchet substantially preventing the gear from being back-driven in the first direction; and the application of a torque disposed to back-drive the gear in the second direction effects an axial force on the external gear, the axial force urging the external gear towards the second ratchet to substantially couple the second ratchet with the external gear, the second ratchet substantially preventing the gear from being back-driven in the second direction.

25. The self-locking device of claim 1, wherein the first and second ratchets respectively comprise first and second ratchet cams disposed to engage respective first and second pawls.

26. The self-locking device of claim 25, wherein the first and second pawls are spring loaded.

27. The self-locking device of claim 25, wherein the first and second pawls are coupled to a housing, the gear, the first and second ratchets, and the first and second releasable couplings being disposed in the housing.

28. The self-locking device of claim 25, further comprising first and second bearing members, the first bearing member being interposed between the first ratchet and the housing and the second bearing member being interposed between the second ratchet and the housing.

29. A gearbox comprising:

the self-locking device of claim 1, a gear set coupled to the self-locking device, the gear set including at least one gear member.

30. A self-locking device for a gear set, the device comprising:

a drive shaft;

a gear disposed to rotate with the drive shaft;

first and second releasable couplings disposed on opposing sides of the gear;

first and second ratchets respectively coupled to the first and second releasable couplings, the first releasable coupling interposed between the gear and the first ratchet and the second releasable coupling interposed between the gear and the second ratchet;

the first ratchet disposed to substantially prevent rotation in a first direction and to permit rotation in a second direction;

the second ratchet disposed to substantially prevent rotation in the second direction and permit rotation in the first direction;

the first releasable coupling disposed to selectively couple and decouple the gear with the first ratchet; and the second releasable coupling disposed to selectively couple and decouple the gear with the second ratchet.

31. A gearbox comprising:

a gear set including a gear meshed with a wheel;

the gear being disposed to rotate with a drive shaft;

first and second releasable couplings coupled to the gear;

first and second ratchets respectively coupled to the first and second releasable couplings;

the first ratchet disposed to substantially prevent rotation in a first direction and to permit rotation in a second direction;

the second ratchet disposed to substantially prevent rotation in the second direction and permit rotation in the first direction;

the first releasable coupling disposed to selectively couple and decouple the gear with the first ratchet;

the second releasable coupling disposed to selectively couple and decouple the gear with the second ratchet; and the releasable couplings being configured to automatically, selectively engage and disengage the ratchets with the gear, the selective engaging and disengaging permitting the input to be forward-driven in either of the rotational directions and substantially preventing the output from being back-driven in either of the rotational directions.

32. The gearbox of claim 31, wherein:

the gear comprises a worm gear; and the wheel comprises a worm wheel.

33. The gearbox of claim 31, wherein:

the gear comprises a helical gear; and the wheel comprises a helical wheel.

34. The gearbox of claim 33, wherein an axis of rotation of the helical gear is substantially perpendicular to an axis of rotation of the helical wheel.

35. The gearbox of claim 33, wherein an axis of rotation of the helical gear is substantially parallel to an axis of rotation of the helical wheel.

36. The gearbox of claim 31, wherein at least one of the releasable couplings comprises a friction coupling.

37. The gearbox of claim 36, wherein the at least one releasable coupling comprises a friction plate.

38. The gearbox of claim 31, wherein at least one of the releasable couplings comprises a mechanical coupling.

39. The gearbox of claim 31, wherein said selective coupling and decoupling of the gear with the first and second ratchets is effected by natural axial forces in the gear, the natural axial forces being generated by engagement of the gear with the wheel.

40. The gearbox of claim 31, wherein:

the application of a torque disposed to forward-drive the drive shaft in the first direction effects an axial force on the gear, the axial force urging the gear towards the second ratchet to substantially couple and decouple respectively the second and first ratchets with the gear, permitting the wheel to be forward-driven substantially freely in the first direction; and the application of a torque disposed to forward-drive the drive shaft in the second direction effects an axial force on the gear, the axial force urging the gear towards the first ratchet to substantially couple and decouple the first and second ratchets with the gear, permitting the wheel to be forward-driven substantially freely in the second directions.

41. The gearbox of claim 31, wherein:

the application of a torque disposed to back-drive the wheel in the first direction effects an axial force on the gear, the axial force urging the gear towards the first ratchet to substantially couple the first ratchet with the gear, the first ratchet substantially preventing the wheel from being back-driven in the first direction; and the application of a torque disposed to back-drive the wheel in the second direction effects an axial force on the gear, the axial force urging the gear towards the second ratchet to substantially couple the second ratchet with the gear, the second ratchet substantially preventing the wheel from being back-driven in the second direction.

42. A method of fabricating a gearbox, the method comprising:

providing a gear set including a gear meshed with a wheel, the gear being disposed to rotate with a drive shaft;

coupling first and second releasable couplings to the gear;

coupling first and second ratchets respectively to the first and second releasable couplings;

disposing the first ratchet to substantially prevent rotation in the first direction and to permit rotation in the second direction;

disposing the second ratchet to substantially prevent rotation in the second direction and permit rotation in the first direction;

disposing the first releasable coupling to selectively couple and decouple the gear with the first ratchet;

disposing the second releasable coupling to selectively couple and decouple the gear with the second ratchet; and the releasable couplings being configured to automatically, selectively engage and disengage the ratchets with the gear, said selective engaging and disengaging permitting the input to be forward-driven in either of the rotational directions and substantially preventing the output from being back-driven in either of the rotational directions.

* * * * *